US012791430B2

(12) United States Patent
Laferriere et al.

(10) Patent No.: US 12,791,430 B2
(45) Date of Patent: Nov. 10, 2026

(54) DUAL-END LOOPBACK-BASED MULTI-FIBER CABLE MEASUREMENT

(71) Applicant: VIAVI SOLUTIONS INC., Chandler, AZ (US)

(72) Inventors: Jerome Laferriere, Lyons (FR); Andre Champavere, Saint-Bonnet les Oules (FR); Luis Fillipe Couto De Araujo Pereira, Miramar, FL (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 59 days.

(21) Appl. No.: 19/062,783

(22) Filed: Feb. 25, 2025

(65) Prior Publication Data

US 2025/0189405 A1 Jun. 12, 2025

Related U.S. Application Data

(63) Continuation of application No. 17/873,303, filed on Jul. 26, 2022, now Pat. No. 12,264,984.

(30) Foreign Application Priority Data

Mar. 28, 2022 (EP) .................................... 22305388

(51) Int. Cl.
*G01M 11/00* (2006.01)

(52) U.S. Cl.
CPC ............................... *G01M 11/3109* (2013.01)

(58) Field of Classification Search
None
See application file for complete search history.

(56) References Cited

U.S. PATENT DOCUMENTS 8,670,110 B2 * 3/2014 Schillab ............... H04B 10/073 356/73.1
10,371,596 B2 * 8/2019 L'Heureux ........ G01M 11/3136
(Continued)

FOREIGN PATENT DOCUMENTS

EP 3996295 A1 5/2022

OTHER PUBLICATIONS

A.M. Ortiz et al., "Multi-Core Optical Fibers: Theory, Applications and Opportunities", Selected Topics on Optical Fiber Technologies and Applications. In Tech, Feb. 14, 2018, 36 pages.
(Continued)

*Primary Examiner* — Kara E. Geisel
*Assistant Examiner* — Chad Andrew Reverman
(74) *Attorney, Agent, or Firm* — Mannava & Kang, P.C.

(57) ABSTRACT

A loopback-based measurement of a multi-fiber cable that contains a plurality of optical fibers, including: connecting a near-end connector to a near end of the multi-fiber cable, connecting a far-end connector to a far end of the multi-fiber cable, connecting a fiber optic reflectometer to the near end connector to access the plurality of optical fibers of the multi-fiber cable, connecting a multi-fiber loopback device to the far-end connector to access the plurality of optical fibers of the multi-fiber cable, and connecting, using the multi-fiver loopback device, every two far ends of the plurality of optical fibers of the multi-fiber cable to cause every two optical fibers of the multi-fiber cable to link together in series and enable the fiber optic reflectometer to simultaneously measure every two fibers of the multi-fiber cable.

20 Claims, 10 Drawing Sheets

(56) References Cited

U.S. PATENT DOCUMENTS

| | | | | |
|---|---|---|---|---|
| 10,432,302 | B1 * | 10/2019 | Delgado | H04J 14/02 |
| 11,228,365 | B1 * | 1/2022 | Desplat | G01M 11/3109 |
| 2021/0247583 | A1 * | 8/2021 | Elkins, II | G02B 6/4471 |
| 2022/0146373 | A1 | 5/2022 | Levin et al. | |
| 2022/0360327 | A1 | 11/2022 | Roux et al. | |
| 2023/0050598 | A1 * | 2/2023 | Barrier | G01M 11/3154 |

OTHER PUBLICATIONS

Zhao Zhiyong et al., “Distributed multicore fiber sensors”, Opto-Electronic Advances, vol. 3, No. 2, Feb. 22, 2020, pp. 19002401-19002417.

EPO, “Communication pursuant to Article 94(3) EPC for European Application No. 23155320.7”, dated Feb. 6, 2026, 7 pages.

* cited by examiner

DUAL-END LOOPBACK-BASED MULTI-FIBER CABLE MEASUREMENT

PRIORITY

This application is a Continuation of commonly assigned and co-pending U.S. patent application Ser. No. 17/873,303, filed on Jul. 26, 2022, which claims priority under 35 U.S.C. 119(a)-(d) to European Patent Application Number 22305388.5, having a filing date of Mar. 28, 2022, all of which are hereby incorporated by reference in their entireties.

BACKGROUND

A fiber optic cable may include one or more optical fibers. The optical fibers may transmit light from a source to a destination. The transmitted light may be backscattered and reflected. The backscattered and reflected light may be analyzed to determine properties of the optical fibers. Multi-fiber cables such as ribbon cables may be used in fiber optic cables. In multi-fiber cables, a large number of ribbon cables may be combined for the manufacture of cables with high fiber counts. Ribbon cables may also be used to create patch cords to connect equipment. The ribbon cables may be tested using an optical reflectometer, but the number of fibers to be tested may affect the measurement time.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
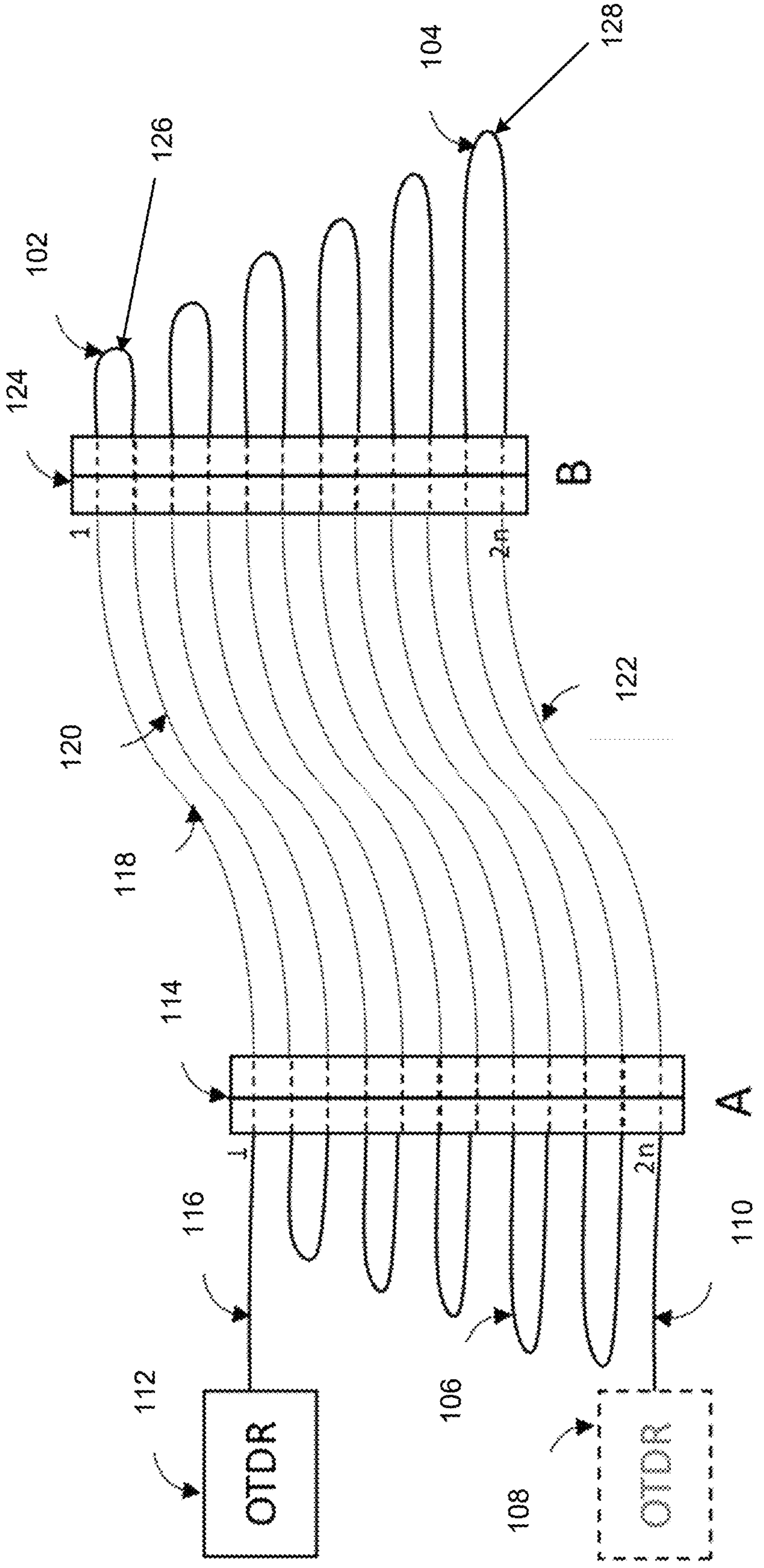
FIG. 1 illustrates a layout of a dual-end loopback-based multi-fiber cable measurement apparatus, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Dual-end loopback-based multi-fiber cable measurement apparatuses, and methods for dual-end loopback-based multi-fiber cable measurement are disclosed herein. The apparatuses and methods disclosed herein provide for automation of multi-fiber qualification within the same cable.

With respect to multi-fiber qualification, when qualifying a large number of fibers with an optical time-domain reflectometer (OTDR), the testing time may take a relatively large part of the overall qualification. This may be acceptable when a limited number of fibers are to be tested. However, with the development of networks, such as Passive Optical Networks (PONs), data centers, and wireless/5G networks, etc., high fiber count cables are now provided, for example, with 6912 fibers in one cable. In this regard, it is technically challenging to expedite the fiber qualification, particularly when bi-directional OTDR measurements are needed. For measurements that may need to be made fiber by fiber or pair of fibers by pair of fibers, it is technically challenging to eliminate handling errors during multiple manipulations of optical connectors.

The apparatuses and methods disclosed herein address at least the aforementioned technical challenges by implementing automatic (e.g., without human intervention) identification and qualification from an overall trace acquisition of individual fiber sections having specific trace sections. The apparatuses and methods disclosed herein further provide for performance of a single acquisition to test multiple fibers (e.g., by looping the fibers altogether), thus significantly reducing qualification time. For example, assuming that an acquisition for twelve fibers at thirty seconds each takes 360 seconds, by looping all of the fibers together as disclosed herein, a single acquisition that takes, for example, forty seconds may be performed. For a cable including 1728 fibers, the qualification time savings may be on the order of several (e.g., thirteen) hours.

According to examples disclosed herein, the apparatus may include at least two multi-fiber loopback devices respectively connected to a near end and a far end of a multi-fiber cable to place at least two fibers of the multi-fiber cable in series. The at least two multi-fiber loopback devices may include a near-end multi-fiber loopback device connected to a fiber optic reflectometer and to the near end of the multi-fiber cable to connect together at least two near-end fibers of the multi-fiber cable. Further, the at least two multi-fiber loopback devices may include a far-end multi-fiber loopback device connected to the far end of the multi-fiber cable to connect together at least two far-end fibers of the multi-fiber cable.

According to examples disclosed herein, at least one of the at least two multi-fiber loopback devices may include fiber loops with different lengths for fiber identification.

According to examples disclosed herein, the at least two multi-fiber loopback devices may include different fiber types to generate different backscatter signatures for fiber identification.

According to examples disclosed herein, the at least two multi-fiber loopback devices may include reflective devices with different reflectance values for fiber identification.

According to examples disclosed herein, the apparatus may include a multi-fiber launch cable and a multi-fiber receive cable. The multi-fiber cable may be tested between the multi-fiber launch cable and the multi-fiber receive cable.

According to examples disclosed herein, the at least two multi-fiber loopback devices may include a direction sensitive identification device.

According to examples disclosed herein, the multi-fiber cable may include a multicore fiber cable.

According to examples disclosed herein, the fiber optic reflectometer may include an optical frequency domain reflectometer (OFDR).

According to examples disclosed herein, the apparatus may further include an optical switch to switch the fiber optic reflectometer for directional measurement.

According to examples disclosed herein, the method for dual-end loopback-based multi-fiber cable measurement may include connecting at least two multi-fiber loopback devices to a near end and a far end, respectively, of a multi-fiber cable to place at least two fibers of the multi-fiber cable in series. The method may include connecting a near-end multi-fiber loopback device to a fiber optic reflectometer and to the near end of the multi-fiber cable to connect together at least two near-end fibers of the multi-fiber cable. Further, the method may include connecting a far-end multi-fiber loopback device to the far end of the multi-fiber cable to connect together at least two far-end fibers of the multi-fiber cable.

According to examples disclosed herein, the method may further include placing a highly reflective event at an end of a link formed by the at least two fibers and loops in series for bi-directional single-ended measurement.

According to examples disclosed herein, the method may further include providing at least one of the at least two multi-fiber loopback devices with fiber loops of different lengths for fiber identification.

According to examples disclosed herein, the method may further include providing the at least two multi-fiber loopback devices with different fiber types to generate different backscatter signatures for fiber identification.

According to examples disclosed herein, the method may further include providing the at least two multi-fiber loopback devices with reflective devices of different reflectance values for fiber identification.

According to examples disclosed herein, the method may further include testing the multi-fiber cable between a multi-fiber launch cable and a multi-fiber receive cable.

According to examples disclosed herein, the method may further include providing the at least two multi-fiber loopback devices with a direction sensitive identification device.

According to examples disclosed herein, the apparatus may include a first multi-fiber loopback device connected to a near end of a multi-fiber cable, and a second multi-fiber loopback device connected to a far end of the multi-fiber cable to place at least two fibers of the multi-fiber cable in series.

According to examples disclosed herein, the first multi-fiber loopback device may include a near-end multi-fiber loopback device connected to the near end of the multi-fiber cable to connect together at least two near-end fibers of the multi-fiber cable.

According to examples disclosed herein, the second multi-fiber loopback device may include a far-end multi-fiber loopback device connected to the far end of the multi-fiber cable to connect together at least two far-end fibers of the multi-fiber cable.

According to examples disclosed herein, the first multi-fiber loopback device may include fiber loops with different lengths for fiber identification.

Figure 2:
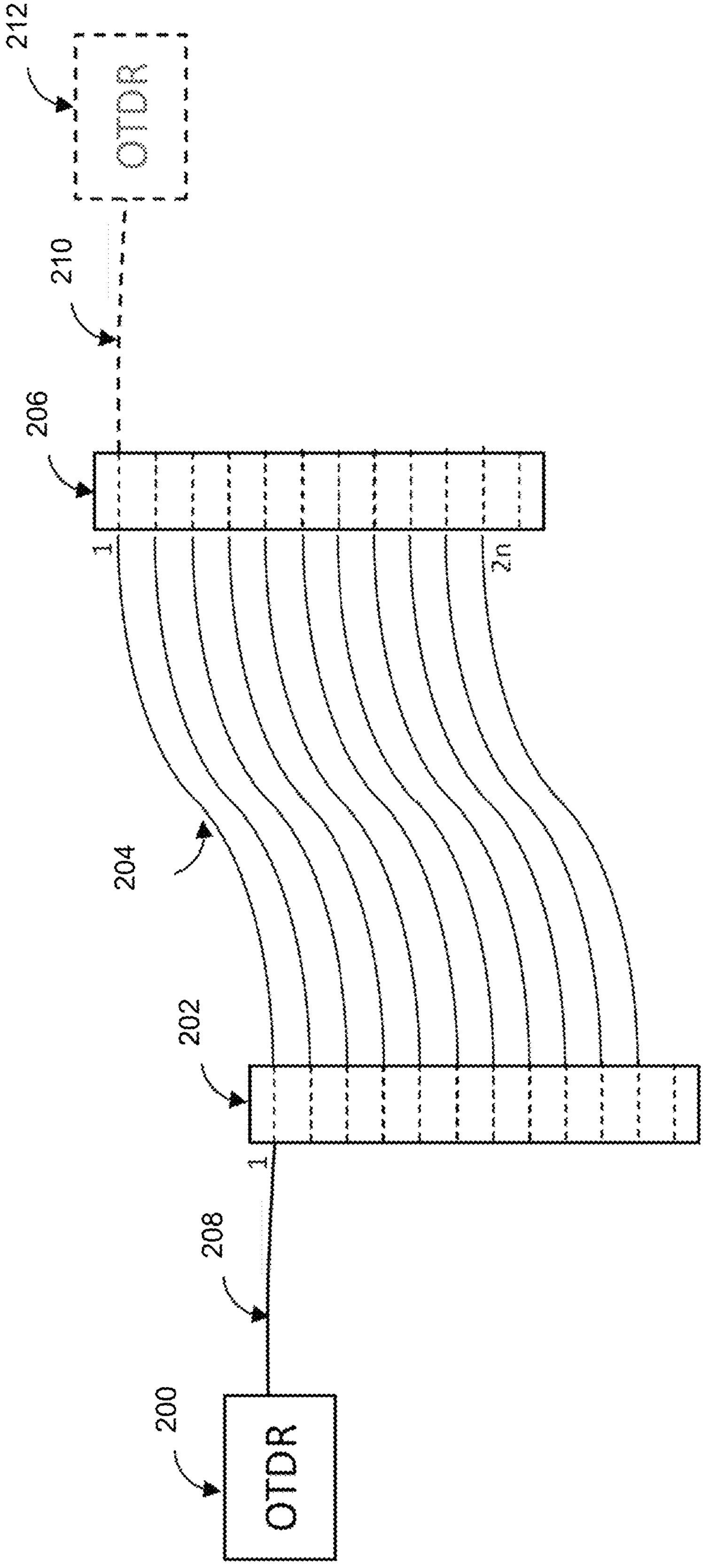
FIG. 2 illustrates an example of a multi-fiber cable configuration for measurement by an optical time-domain reflectometer (OTDR), in accordance with an example of the present disclosure.

FIG. 2 illustrates an example of a multi-fiber cable configuration for measurement by an OTDR, in accordance with an example of the present disclosure.

Referring to FIG. 2, in the case of a measurement by a single end, an OTDR 200 may be connected to the multi-fiber connector A at 202 by a fiber cable 208. The fiber link to be tested, including fiber link 204, connectors A at 202 and B at 206 may be tested between launch fiber cable 208 and receive fiber cable 210. A round trip measurement may also be performed by connecting an OTDR 212 to the fiber cable 210, for example, in the case of data centers.

Figure 3:
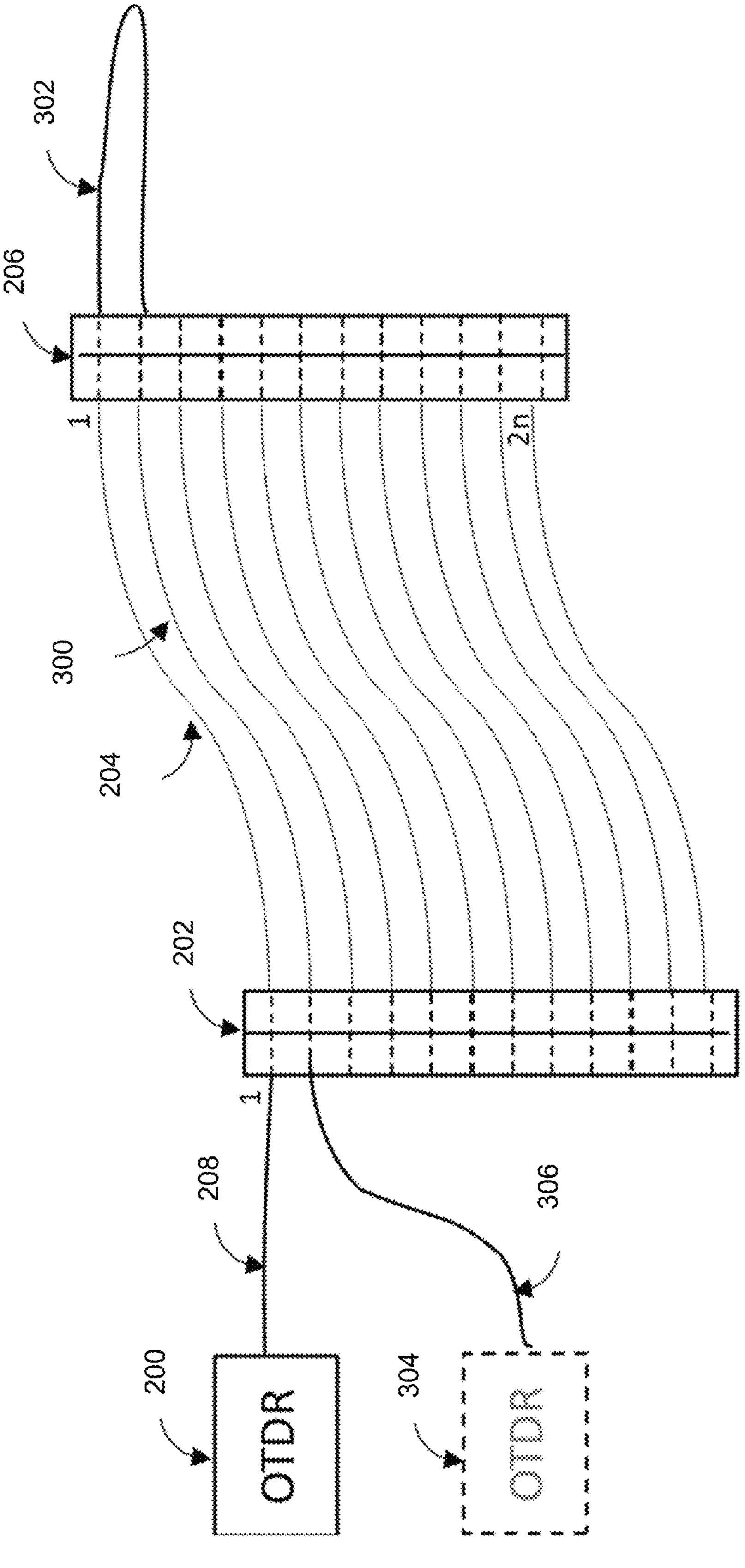
FIG. 3 illustrates an example of a multi-fiber cable configuration including a loop back for measurement by an OTDR, in accordance with an example of the present disclosure.

FIG. 3 illustrates an example of a multi-fiber cable configuration including a loop back for measurement by an OTDR, in accordance with an example of the present disclosure.

Referring to FIGS. 2 and 3, and particularly to FIG. 3, the simultaneous test of two fiber links 204 and 300 with associated connectors 202 and 206, or the bidirectional measurement may also be performed by looping back (e.g., at 302) two ports of far-end connector 206 coupling the OTDR signal on the second fiber link 300. For the bidirectional measurement, an OTDR measurement 304 may be performed in the other direction through a launch fiber cable 306.

The configurations of FIGS. 2 and 3 may be based on utilization of a single loopback device coupled at the far end. Depending on the wiring type of cable under test (e.g., multi-fiber push on connectors (MPO) straight, reversed, or pair flipped), multiple preconfigured arrangements may be utilized to cover the different types (e.g., straight (A), reversed (B), or pair flipped (C)) to allow for fiber characterization and identification.

Figures 4A, 4B, 4C:
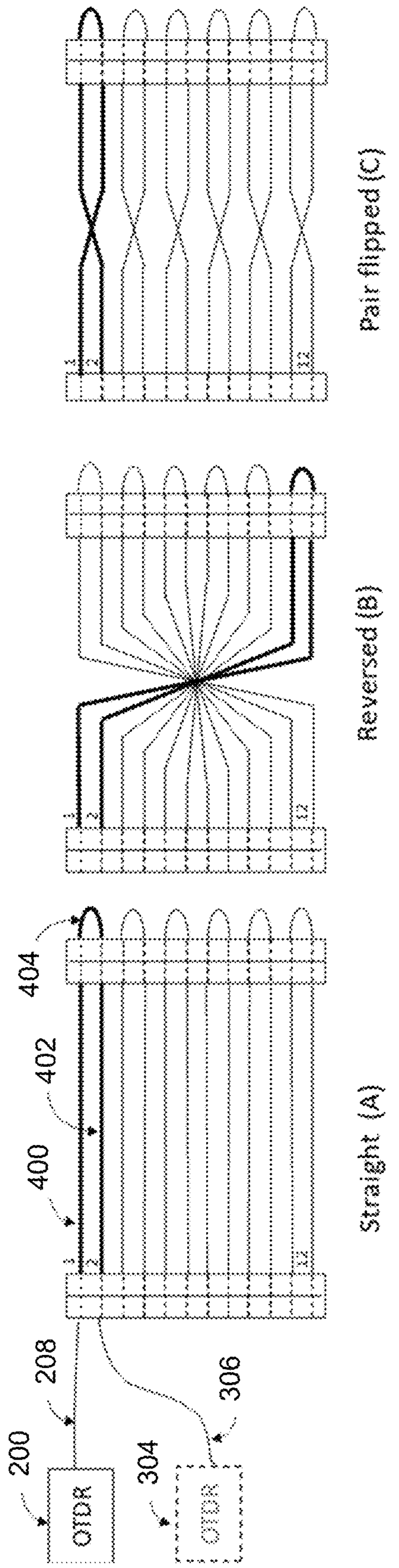
FIG. 4A illustrates a configuration based on use of a single loopback device connected at an end of a 12-fiber multi-fiber push on connector (MPO) type cable.
FIG. 4B illustrates an associated reversed configuration.
FIG. 4C illustrates an associated flipped configuration, in accordance with an example of the present disclosure.

FIG. 4A illustrates a configuration based on use of a single loopback device connected at an end of a 12-fiber multi-fiber push on connector (MPO) type cable, FIG. 4B illustrates an associated reversed configuration, and FIG. 4C illustrates an associated pair flipped configuration, in accordance with an example of the present disclosure.

Referring to FIG. 4A, the loopback configuration as shown may make it possible to connect the odd fiber to the next even fiber on the remote connector. For example, and in the case of type A (straight) wiring, the OTDR measurement will test fiber 1 (e.g., at 400) with fiber 2 (e.g., at 402) in series using the fiber loop 404. Thus, if the type of cable under test is unknown, reversed (e.g., FIG. 4B) or even flipped (e.g., FIG. 4C), a fixed configuration of the loopback system may lead to a different optical path (e.g., testing a different pair of fibers).

The identification of the cable wiring may be possible using an identification device that generates different signatures when tested by an OTDR. The multi-fiber near-end connector may be tested through a device using fibers of different lengths to identify the connector pin. This identification device may not identify all cases. For example, in the case of inverted pairs described in FIG. 4C, an identification technique may need to be used based on the generation of signatures that depend on the test direction, such as the presence of a reflective or attenuating event not centered on the fibers connected to the near end.

Figure 5:
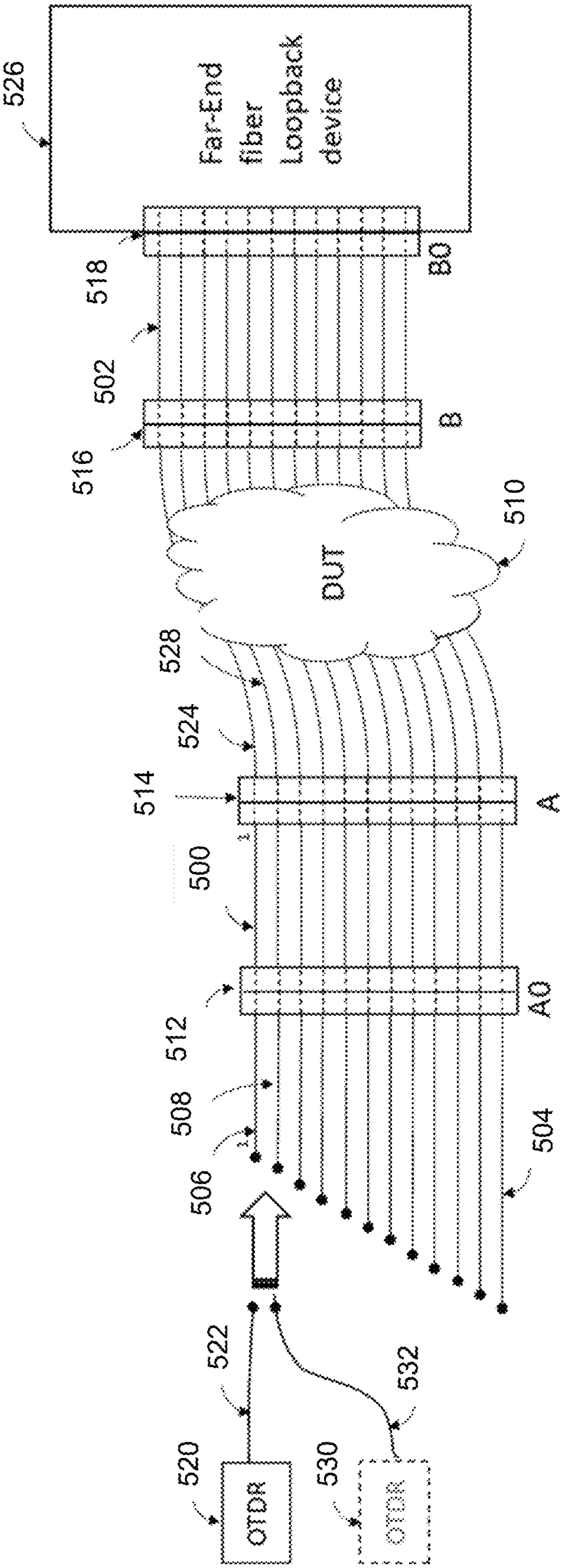
FIG. 5 illustrates a configuration using an additional cable on each side of a cable under test, in accordance with an example of the present disclosure.

FIG. 5 illustrates a configuration using an additional multi-fiber cable on each side of a fiber cable under test, in accordance with an example of the present disclosure.

The use of a multi-fiber cable may be added as a multi-fiber launch fiber or a multi-fiber receive cable, as well as a way to protect the measurement system connectors. In this regard, referring to FIG. 5, similar to FIG. 3, the OTDR 520 may be connected to a fiber cable 522, and this fiber cable may be connected to the fiber 506, which is connected to the first port of a multi-fiber connector A0 at 512. A multi-fiber cable 500 may make the connection between the two multi-fiber connectors A0 at 512 and A at 514, for example interconnecting the first port of the connector A0 at 512 to the first port of the connector A at 514.

The first fiber link 524 of the device under test (DUT) may be between the first port/fiber of multi-connector A at 514, and the first port of multi-connector B at 516. Multi-fiber cable 502 may make the connection between the first port of the multi-fiber connector B at 516 and the first port of the multi-connector B0 at 518. A far-end fiber loop device 526 may be connected, as shown in FIG. 4A, which is made, for example, of successive loopback fibers interconnecting the different ports/fibers of the multi-connector B0 at 518. For example, the fiber/port of B0 may be connected to the second port/fiber of B0, using a fiber of predefined length. Then, for example, the second port/fiber of this multi-fiber connector B0 at 518 may be connected to the second port/fiber of the multi-fiber connector B at 516 via the multi-fiber cable 502. The second fiber link 528 of the device under test (DUT) 510 may connect, for example, the second port/fiber of the multi-fiber connector B at 516 to the second port/fiber of the multi-fiber connector A at 514. With the multi-fiber cable 500, for example, the second port/fiber of the multi-fiber connector A at 514 may be connected to the second port of the multi-fiber connector A0 at 512. Then, the second port of the multi-fiber connector A0 at 512 may be connected to the fiber 508, which may be of a predefined length.

The simultaneous test of the two fiber links 524 and 528 may then be performed with the use of the OTDR 520 connected to fiber 506. For the bidirectional measurement, an OTDR measurement at 530 may thus be performed in the other direction through the launch cable 532 connected to fiber 508.

The A to B device under test with unknown wiring type may be between two multi-fiber cables, the A0 at 512 to A at 514 on the near end side and the B at 516 to B0 at 518 on the far end side. In such configuration, the OTDR may qualify the wiring type at 504 based on the use of different length fiber 506 versus fiber 508, etc., and then to the device under test 510 through the multi-fiber cable 500.

The use of a ribbon multi-fiber cable 500 may allow the use of short length far-end fiber loops and also short length identification fibers with a length measurement that may use reflective event relative measurement that may be limited by the OTDR event dead zone performance.

Compared to the configurations of FIGS. 2-5, as disclosed herein with respect to FIGS. 1 and 6-11, the apparatuses and methods disclosed herein may provide for the performance of simultaneous reflectometric measurements on more than two fibers of a multi-fiber cable in a single measurement. When applied to the measurement of ribbon cables (e.g., 12 or more fibers), the apparatuses and methods disclosed herein may provide a relatively significant time saving for reflectometric measurements. Moreover, the apparatuses and methods disclosed herein may provide for identification of the wiring of a ribbon cable (e.g., straight-through, cross-over, etc.).

FIG. 1 illustrates a layout of a dual-end loopback-based multi-fiber cable measurement apparatus (hereinafter also referred to as "apparatus 100"), in accordance with an example of the present disclosure.

Referring to FIG. 1, the apparatus 100 may implement optical fiber loops (e.g., 102, 104, and 106) on both ends of the optical link cable to be tested. The addition of the fiber loops on both sides of the link may provide for the connection of all of the fibers of the same cable link in series, thus providing for the simultaneous measurement of all fiber links (from 1 to 2n) from an OTDR.

The OTDR 112 may be connected to the multi-fiber connector A at 114 by the fiber cable 116. Once the OTDR acquisition is performed, the corresponding trace may show all connected fibers, with the ability to identify the individual sections (e.g., fiber link 118, then fiber link 120, etc. . . . , up to fiber link 122)

The first fiber section to be qualified, made of fiber link 118, and connectors A at 114 and B at 124, may be measured between the launch and receive fiber cables 116 and 126. Similarly, for the other fiber sections of the multi-fiber link including the last fiber section, which are made of fiber link 122, and connectors A at 114 and B at 124, these fiber sections may be measured between the launch and receive fiber cables 110 and 128, respectively.

Bidirectional measurement may also be implemented by connecting an OTDR 108 to the fiber cable 110, which would be connected to the last port/fiber of the multi-fiber connector A at 114. Thus, in two measurements, all of the fibers in the cable links may be tested in both directions.

The apparatus 100 may provide for the identification and verification of the arrangement of the fibers of a multi-fiber cable from the detected signature. In the example of FIG. 1, loop fibers of different lengths may be used for fiber identification and types of cabling (e.g., straight through, crossed, reversed paired or others arrangement types). In addition to using different fiber lengths to identify fibers, fibers with different backscatter coefficients may also be utilized. In this regard, the identification may be performed on one or on the other side (e.g., near-end or far-end).

Figure 6:
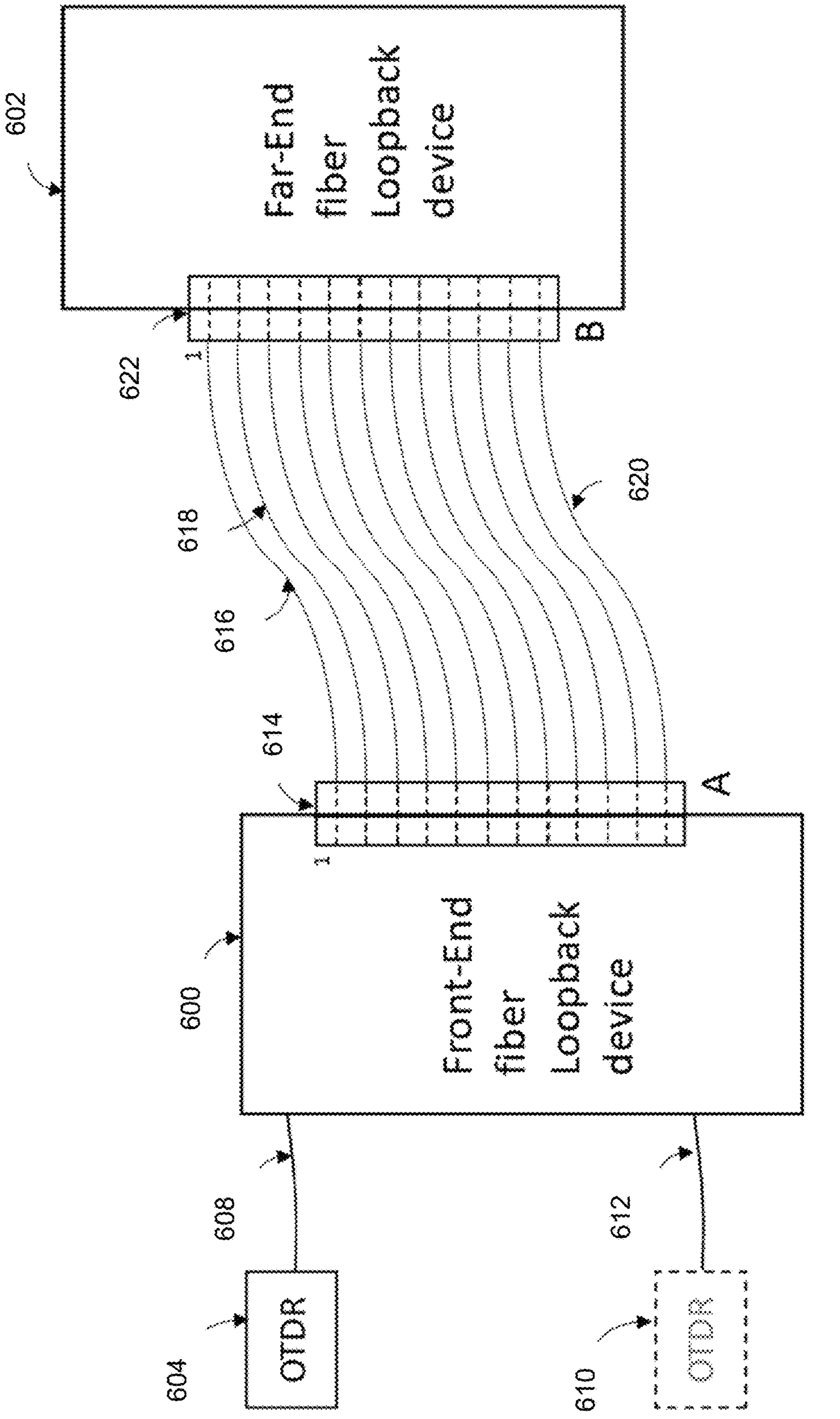
FIG. 6 illustrates a layout of the dual-end loopback-based multi-fiber cable measurement apparatus of FIG. 1, in the form of two systems, a first to which measuring devices are connected, and a second connected to the other end of fiber cable under test, in accordance with an example of the present disclosure.

FIG. 6 illustrates a layout of the apparatus 100 in the form of two systems, a first to which measuring devices are connected, and a second connected to the other end of the fiber cable under test, in accordance with an example of the present disclosure.

Referring to FIG. 6, the apparatus 100 may be described in the form of two systems, one system (e.g., near-end fiber loopback device 600) to which the measuring devices are connected, and a second system (e.g., far-end fiber loopback device 602) connected to the other end of the fiber cable under test. In this regard, all of the individual elements of the links may be qualified (e.g., front-end multi-fiber connector A at 614, individual fiber links 616, 618, . . . 620, as well as far-end multi-fiber connector B at 622.

An OTDR 604 may be connected to the near-end fiber loopback device 600 through a fiber cable 608. An OTDR 610, may be connected through the fiber cable 612 to add OTDR measurement in a reverse direction for both end (e.g., bi-directional) measurements. The two fiber optic loopback devices may include fiber identification capabilities using different length of fiber loopbacks or other solutions.

The OTDR 604 (e.g., a single OTDR) may be used for the bidirectional measurement in a sequential mode (e.g., manually and automatically switched from one fiber cable 608 to the other fiber cable 612). Although not shown, multi-fiber launch and receive cables may be used on both sides of the DUT.

Figure 7:
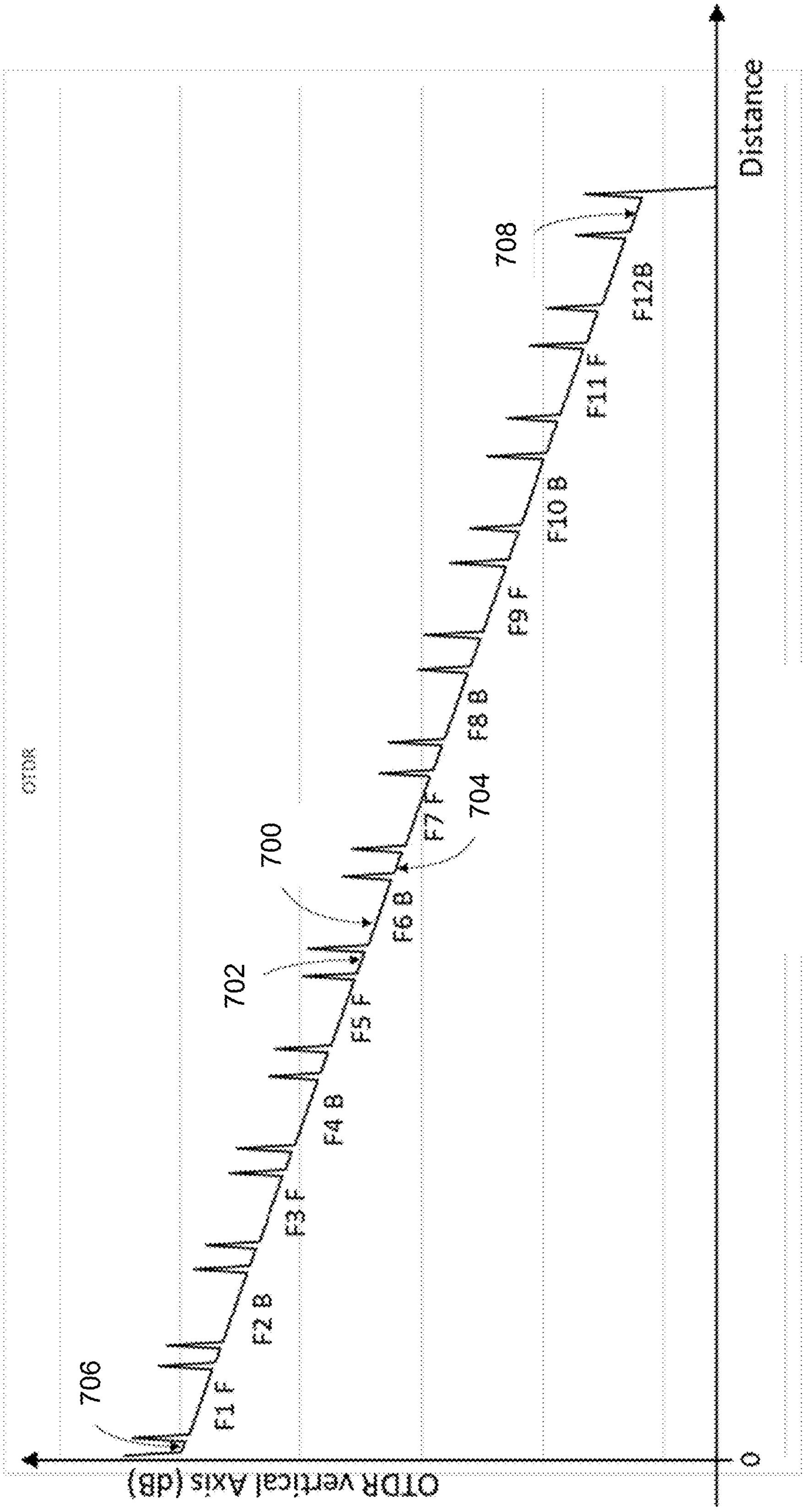
FIG. 7 illustrates a simulation of an OTDR trace obtained on a twelve fiber optical cable using the loop-back systems of FIG. 6, in accordance with an example of the present disclosure.

FIG. 7 illustrates a simulation of an OTDR trace obtained on a twelve fiber optical cable using the loop-back systems of FIG. 6, in accordance with an example of the present disclosure.

Referring to FIG. 7, the example in FIG. 7 illustrates a simulation of an OTDR trace obtained on a twelve fiber optical cable (e.g., ribbon cable) using the two loop-back systems (front-end and far-end as described above) of FIG. 6. FIG. 7 further illustrates the measurement of the attenuation of each fiber and the reflections at its ends (e.g., fiber marked F6 B). The suffix F may correspond to a measurement in the forward direction from the near-end connector to the far-end connector. The suffix B may correspond to the reverse direction (e.g., backward direction). Each trace section corresponding to a fiber may be between two loop sections. For example, the F6 backward section 700 may be surrounded by loops 702 and 704. The launch cable 706 may be utilized for connection to the OTDR. Likewise, fiber 708 may represent the received fiber cable to which the OTDR may be connected for complementary measurement (e.g., F12 F, F1 B, F10 F, F9 B, F8 F, F7 B, F6 F, F5 B, F4 F, F3 B, F2 F and F1 B). The combination of the two measurements may provide the information that is needed for bidirectional measurements of each fiber.

The OTDR trace of FIG. 7 may correspond to a straight through wiring type of ribbon cable. In this example, the loop back fiber length may increase from fiber 1 to fiber 12. The trace may change in case of other types of wiring and may be used to identify the wiring type.

The apparatus 100 may be applicable to multimode fibers as well as single mode fibers. Further, the apparatus 100 may be applied to the test of multi-core fibers (MCF) using connector type fan-out devices for MCF fibers.

Figure 8:
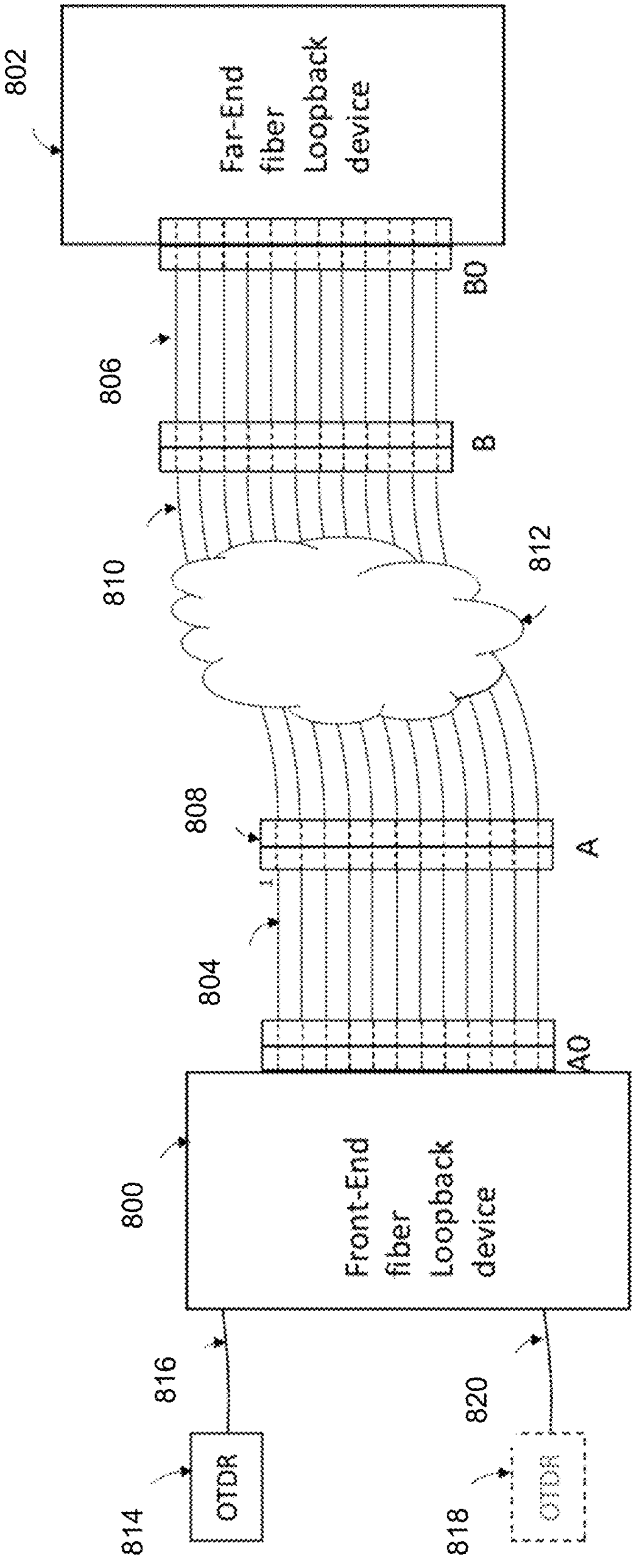
FIG. 8 illustrates an example of a configuration for MPO 12 fibers, in accordance with an example of the present disclosure.

FIG. 8 illustrates an example of a configuration for MPO 12 fibers, in accordance with an example of the present disclosure.

Referring to FIG. 8, the MPO 12 fibers show the combined use of two loopback devices 800 and 802, through launch and receive fiber cables 804 and 806 respectively. The far-end fiber loopback device 802 may include fixed six loopback fibers, and the near-end loopback device may include five loopback fibers.

The link elements to be tested per fiber may include multi-fiber connectors A at 808 and B at 810, as well as the fiber link 812 itself.

In order to perform a single OTDR test, an OTDR 814 may be connected to the front-end loopback device 800 via fiber cable 816. Further, an OTDR 818 may be connected through the fiber cable 820 to add OTDR measurement in a reverse direction for both end (e.g., bi-directional) measurements.

A least, one of the two loopback devices may include an identification device, for example using fibers with different lengths, to identify the successive fibers of the DUT. Further, the identification device may also be direction sensitive (e.g., direction dependent OTDR signature).

The use of a ribbon launch and receive fiber cables 804 and 806 respectively may provide for the use of short length near end and far-end fiber loops. Further, the use of the ribbon launch and receive fiber cables 804 and 806 respectively may provide for short length identification fibers with a length measurement that may use reflective event relative measurement that may be limited by the OTDR event dead zone performance.

Figure 9:
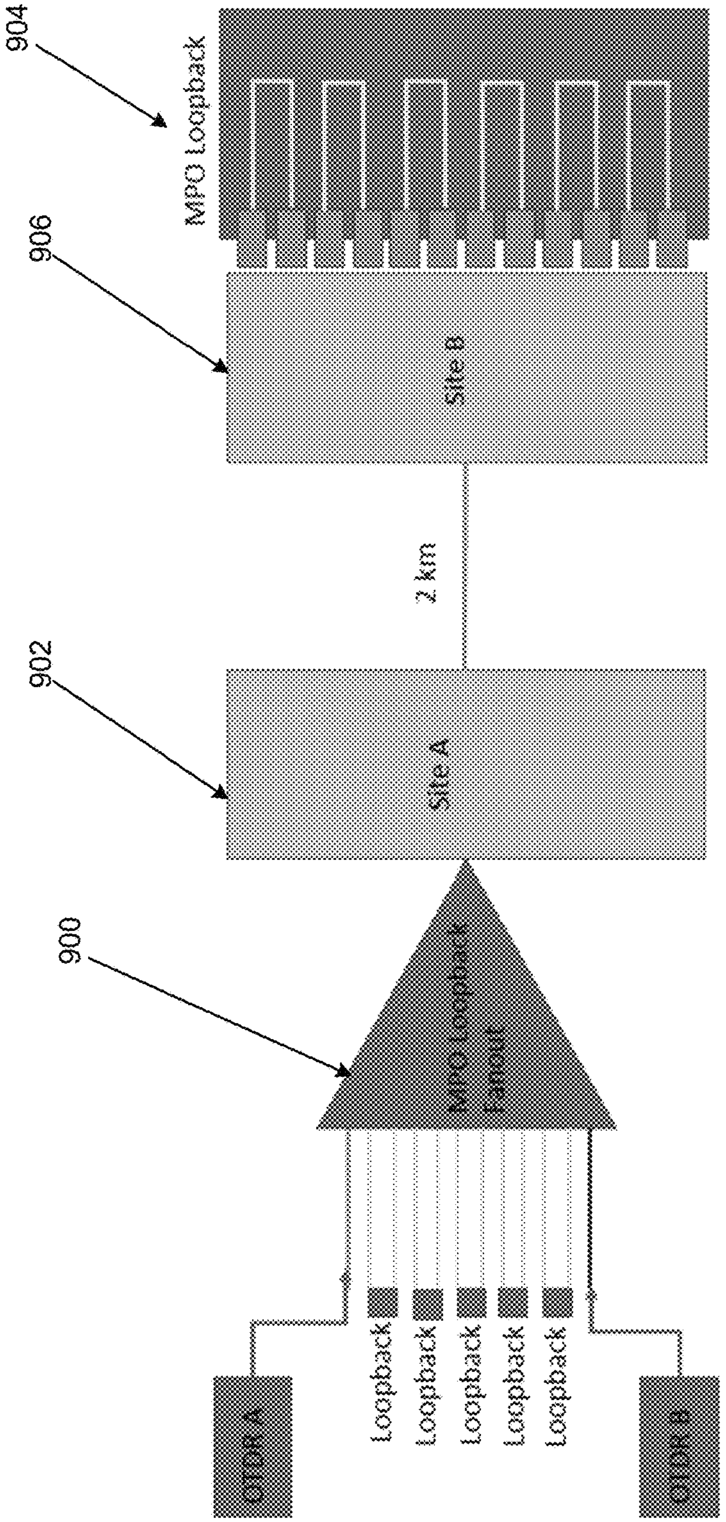
FIG. 9 is an example of FIG. 8, in which a network to be tested is a native MPO network made of twelve fiber MPO connectors and fiber cables, in accordance with an example of the present disclosure.

FIG. 9 is an example of FIG. 8, in which the 2 km network to be tested is a native MPO network made of twelve fiber MPO connectors and fiber cables, in accordance with an example of the present disclosure.

Referring to FIG. 9, in order to be connected to this network type, for example, the front-end loopback device may include an MPO loopback fanout at 900 and loopback fibers interconnecting the different fibers of the MPO connector associated to the location/site A at 902. For example, the far-end fiber loopback device may include an MPO loopback at 904 made of loopback fibers interconnecting the different fibers of the MPO connector associated to the location/side B at 906.

Figure 10:
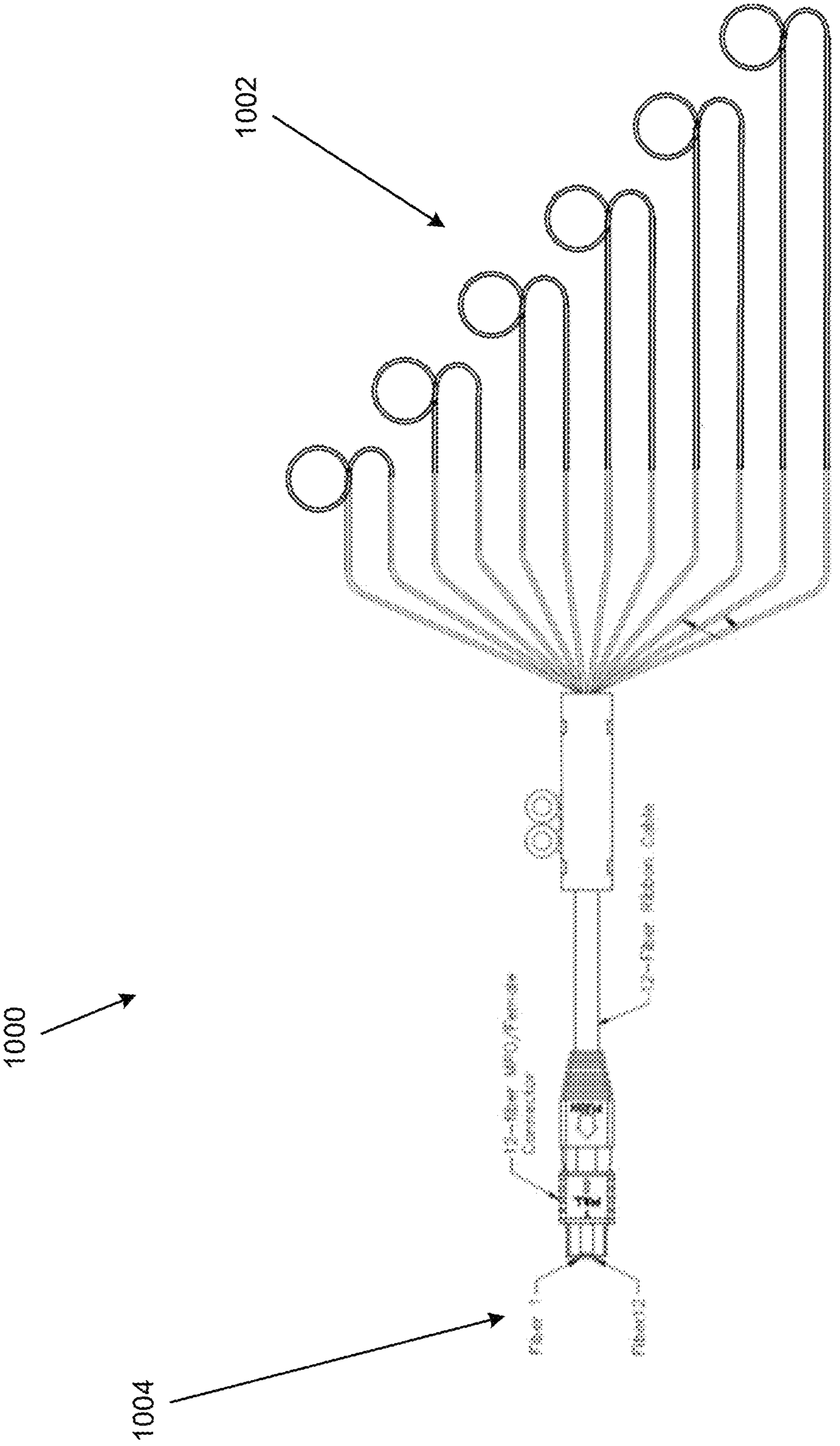
FIG. 10 illustrates a far-end fiber loopback device, such as the far-end fiber loopback device of FIG. 6, in accordance with an example of the present disclosure.

FIG. 10 illustrates a far-end fiber loopback device, such as the far-end fiber loopback device of FIG. 6, in accordance with an example of the present disclosure.

Referring to FIG. 10, the far-end fiber loopback device 1000 shows the loopback fibers made of different fiber lengths at 1002 to interconnect the individual fibers and a 12-fiber MPO connector at 1004. The front-end fiber loopback device (not shown) may be identical to the far-end fiber loopback device 1000, but include a mirrored configuration (e.g., loopback fibers made of different fiber lengths to the left in the orientation of FIG. 10), and with the first fiber and the last fiber opened for connection to an OTDR.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A loopback-based multi-fiber cable measurement apparatus comprising:

a multi-fiber cable containing a plurality of optical fibers, wherein the plurality of optical fibers include near ends and far ends;

a near-end connector connecting to the near ends of the plurality of optical fibers of the multi-fiber cable;

a far-end connector connecting to the far ends of the plurality of optical fibers of the multi-fiber cable;

a fiber optic reflectometer connected to the near end connector to access the plurality of optical fibers of the multi-fiber cable; and a multi-fiber loopback device connected to the far-end connector to access the plurality of optical fibers, and connecting every two far ends of the plurality of optical fibers of the multi-fiber cable to cause every two optical fibers of the multi-fiber cable to link together in series and enable the fiber optic reflectometer to simultaneously measure every two fibers of the multi-fiber cable.

2. The loopback-based multi-fiber cable measurement apparatus according to claim 1, wherein the multi-fiber loopback device includes fiber loops with different lengths for fiber identification.

3. The loopback-based multi-fiber cable measurement apparatus according to claim 1, wherein the multi-fiber loopback device includes different fiber types to generate different backscatter signatures for fiber identification.

4. The loopback-based multi-fiber cable measurement apparatus according to claim 1, wherein the multi-fiber loopback device includes reflective devices with different reflectance values for fiber identification.

5. The loopback-based multi-fiber cable measurement apparatus according to claim 1, further comprising:
a launch fiber cable and a receive fiber cable, wherein the multi-fiber cable is tested between the launch fiber cable and the receive fiber cable.

6. The loopback-based multi-fiber cable measurement apparatus according to claim 1, wherein the multi-fiber loopback device includes a direction sensitive identification device.

7. The loopback-based multi-fiber cable measurement apparatus according to claim 1, further comprising:
an optical switch to switch the fiber optic reflectometer for directional measurement.

8. The loopback-based multi-fiber cable measurement apparatus according to claim 1, wherein the fiber optic reflectometer includes an optical frequency domain reflectometer (OFDR).

9. A method for loopback-based multi-fiber cable measurement, the method comprising:
connecting a near-end connector to a near end of a multi-fiber cable that contains a plurality of optical fibers;
connecting a far-end connector to a far end of the multi-fiber cable;
connecting a fiber optic reflectometer to the near end connector to access the plurality of optical fibers of the multi-fiber cable;
connecting a multi-fiber loopback device to the far-end connector to access the plurality of optical fibers of the multi-fiber cable;
connecting, using the multi-fiver loopback device, every two far ends of the plurality of optical fibers of the multi-fiber cable to cause every two optical fibers of the multi-fiber cable to link together in series and enable the fiber optic reflectometer to simultaneously measure every two fibers of the multi-fiber cable; and
performing, by the fiber optic reflectometer, an acquisition to test every two fibers of the multi-fiber cable by sending a signal from the fiber optic reflectometer to one of the two fibers that are linked together in series.

10. The method according to claim 9, further comprising:
placing a reflective event at an end of the two fibers that are linked together in series for bi-directional single-ended measurement.

11. The method according to claim 9, further comprising:
providing the multi-fiber loopback device with fiber loops of different lengths for fiber identification.

12. The method according to claim 9, further comprising:
providing the multi-fiber loopback device with different fiber types to generate different backscatter signatures for fiber identification.

13. The method according to claim 9, further comprising:
providing the multi-fiber loopback device with reflective devices of different reflectance values for fiber identification.

14. The method according to claim 9, further comprising:
testing the multi-fiber cable between a launch fiber cable and a receive fiber cable.

15. The method according to claim 9, further comprising:
providing the multi-fiber loopback device with a direction sensitive identification device.

16. A loopback-based multi-fiber cable measurement apparatus comprising:
a multi-fiber cable containing a plurality of optical fibers, wherein the plurality of optical fibers include near ends and far ends;
a fiber optic reflectometer connected to the near ends of the plurality of optical fibers of the multi-fiber cable; and
a multi-fiber loopback device connected to the far ends of the plurality of optical fibers of the multi-fiber cable,
wherein the multi-fiber loopback device is to connect every two far ends of the plurality of optical fibers of the multi-fiber cable to cause every two optical fibers of the multi-fiber cable to link together in series and enable the fiber optic reflectometer to simultaneously measure every two fibers of the multi-fiber cable.

17. The loopback-based multi-fiber cable measurement apparatus according to claim 16, further comprising:
an optical switch to switch the fiber optic reflectometer for directional measurement.

18. The loopback-based multi-fiber cable measurement apparatus according to claim 16, wherein the multi-fiber loopback device includes fiber loops with different lengths for fiber identification.

19. The loopback-based multi-fiber cable measurement apparatus according to claim 16, the multi-fiber loopback device includes different fiber types to generate different backscatter signatures for fiber identification.

20. The loopback-based multi-fiber cable measurement apparatus according to claim 16, further comprising:
a launch fiber cable and a receive fiber cable, wherein the multi-fiber cable is tested between the launch fiber cable and the receive fiber cable.

* * * * *